United States Patent [19]
Healy

[11] Patent Number: 6,131,560
[45] Date of Patent: Oct. 17, 2000

[54] PORTABLE GRILL WITH TELESCOPIC LEGS

[76] Inventor: Dennis Healy, 124 W. Castellano, Suite 107, El Paso, Tex. 79912

[21] Appl. No.: 09/519,465

[22] Filed: Mar. 6, 2000

Related U.S. Application Data

[60] Provisional application No. 60/137,453, Jun. 2, 1999.
[51] Int. Cl.[7] ............................. A47J 37/00; A47J 37/07; F24C 1/16
[52] U.S. Cl. ................................ 126/30; 99/449; 99/450; 126/25 R; 126/25 A; 126/9 R
[58] Field of Search ............................. 99/339, 340, 449, 99/450, 482; 126/25 R, 29, 30, 25 A, 25 AA, 9 R, 9 B, 41 R, 41 B, 506; 248/165, 168, 170, 163.2, 188.2, 318, 324; 211/181.1

[56] References Cited

U.S. PATENT DOCUMENTS

| | | | |
|---|---|---|---|
| D. 356,005 | 3/1995 | Goble | D7/337 |
| 2,811,099 | 10/1957 | McGoldrick | 99/421 H |
| 3,946,653 | 3/1976 | Pugh | 99/340 |
| 4,011,804 | 3/1977 | Crockett, Sr. | 99/421 H |
| 4,109,567 | 8/1978 | Gage et al. | 99/450 |
| 4,393,857 | 7/1983 | Sanford | 126/9 R |
| 4,539,901 | 9/1985 | Chen | 99/393 |
| 4,782,812 | 11/1988 | Kellerman | 126/9 |
| 4,782,813 | 11/1988 | Kopke | 126/25 |
| 4,796,599 | 1/1989 | Cooper | 126/9 R |
| 4,815,367 | 3/1989 | Hanson et al. | 99/421 H |
| 4,829,977 | 5/1989 | Valentine | 126/9 R |
| 4,856,423 | 8/1989 | Burns | 99/449 X |
| 4,899,725 | 2/1990 | Barron, Jr. | 126/41 |
| 5,025,715 | 6/1991 | Sir | 99/421 |
| 5,065,734 | 11/1991 | Elliott | 126/9 |
| 5,117,806 | 6/1992 | Soat | 126/29 |
| 5,163,414 | 11/1992 | Haynes, Jr. | 126/25 |
| 5,183,027 | 2/1993 | Saldana | 126/25 |
| 5,287,844 | 2/1994 | Fieber | 126/30 |
| 5,452,706 | 9/1995 | Meza | 126/30 |

FOREIGN PATENT DOCUMENTS

| | | | |
|---|---|---|---|
| 911835 | 10/1972 | Canada | 126/104 |
| 934625 | 8/1973 | Canada | 126/104 |

*Primary Examiner*—Timothy Simone
*Attorney, Agent, or Firm*—Richard C. Litman

[57] ABSTRACT

A portable grill having telescoping legs is disclosed. The grill includes a substantially rectangular grate and two pairs of telescoping legs. Each pair of telescoping legs is pivotally attached to one end of the rectangular grate. The grill can be used to cook food over an open fire, or the grill can be used to cook with charcoal with the aid of a charcoal tray that can be hung below the rectangular grate using S-hooks. The invention also includes a carrying case for allowing the grill to be carried in a backpack without the grill soiling other items in the backpack.

3 Claims, 6 Drawing Sheets

PORTABLE GRILL WITH TELESCOPIC LEGS

CROSS-REFERENCE TO RELATED APPLICATION

This application claims the benefit of U.S. Provisional patent application Ser. No. 60/137,453, filed Jun. 2, 1999.

BACKGROUND OF THE INVENTION

1. Field of the Invention

The present invention relates to a portable grill with telescoping legs which is suitable for being carried in a backpack.

2. Description of Related Art

Grilling is an extremely popular method of cooking. Grilling enhances the flavor of food while resulting in the addition of less! fat to food as compared to other cooking techniques such as frying. In fact, grilling reduces the fat content of food by allowing the fat to drip away from the food. To enjoy the many health benefits of grilled food, backyard barbecue grills have become very popular and can be found in many households. These back-yard barbecue grills use charcoal or charcoal briquettes as fuel.

Grilling foods is also extremely popular among outdoor enthusiasts. Hunters, campers, hikers, and mountain climbers often, grill their food because grilling is well suited for outdoor use and can make use of fuels that are readily available in nature. However, the grills used for backyard barbecues are too heavy and bulky to be suitable for use by campers, hikers, and the like. These types of outdoor enthusiasts need grills that are light and compact. For this reason portable grills have been proposed in the art, and examples of such grills are discussed in some of the references cited below. However, none of the references cited below teach or suggest the unique structural features of the portable grill of the present invention.

U.S. Pat. No. 4,539,901, issued to Ming-Tang Chen on Sep. 10, 1985, shows a grill having rotating racks which support the food items as the food items are being cooked.

U.S. Pat. No. 4,782,812, issued to Dan Kellerman on Nov. 8, 1988, shows a meat grilling device including an open box and a disposable fuel pack which is enclosed in a wire mesh box. In the device of Kellerman, the wire mesh box serves as the, rack for holding the meat as it is cooked.

U.S. Pat. No. 4,782,813, issued to Robert J. Kopke on Nov. 8, 1988, shows collapsible grill having a folding circular rack supported by three detachable legs. The detachable legs of the Kopke device each have a plurality of notches that can be engaged by the peripheral rim of the circular rack.

U.S. Pat. No. 4,899,725, issued to James O. Barron, Jr. on Feb. 13, 1990, shows a barbecue grill that can use charcoal or propane at the option of the user. The grill of Barron, Jr. includes a slidably removable drip tray which underlies removable burners. The drip tray of Barron, Jr. holds the charcoal when the grill is being used as a charcoal grill.

U.S. Pat. No. 5,025,715, issued to John Sir on Jun. 2, 1991, shows a tripod for alternatively supporting a charcoal grill, a cooking pot, or a rotisserie, with the tripod being used to support the rotisserie and the pot over an open fire.

U.S. Pat. No. 5,065,734, issued to Bernard Elliott on Nov. 19, 1991, shows a portable grill including a rack supported on a bottom pan and a top pan which fits over the rack. The bottom pan of Elliott is designed to be removably supported atop a four legged stand.

U.S. Pat. No. 5,163,414, issued to James P. Haynes, Jr. on Nov. 17, 1992, shows a barbecue grill having a rack supported by a pan which is in turn supported by two pairs of legs, with each pair of legs being pivotally attached to the other.

U.S. Pat. No. 5,183,027, issued to Marshall Saldana on Feb. 2, 1993, shows a modular barbecue grill including a firebox supported atop a post and a rack which fits over the firebox. An apron frame surrounds the firebox of Saldana for convenient placement of food and utensils.

U.S. Pat. No. 5,293,859, issued to Mikhail Lisker on Mar. 15, 1994, shows a barbecue grill having an open support lattice surrounded by upright walls. The support lattice supports fuel modules comprising charcoal briquettes supported in a non-flammable pan. The upright walls support a variety of accessories, such as a rotisserie, skewers, and a grill rack.

U.S. Pat. No. 5,676,045, issued to Abdul-Razzak Faraj on Oct. 14, 1997, shows a barbecue grill having a slanted heat directing surface and a slanted cooking rack positioned in parallel to the slanted heat directing surface. The grill of Faraj also includes a vertical heat directing surface positioned such that both sides of food placed on the cooking rack are cooked simultaneously.

U.S. Pat. No. 5,802,9G2, issued to Robert Goldyn on Sep. 8, 1998, shows a grill for cooking over an open fire. The grill of Goldyn includes a circular grill rack supported by four legs of fixed length. The grill of Goldyn also has provision for supporting various accessories such as a rotisserie and skewers above the circular grill rack.

U.S. Pat. No. 5,819,720, issued to Robert L. Schubert on Oct. 13, 1998, shows a variable length post having a flange at one end and a ground penetrating portion at the other end. The, flange of the Schubert device allows the variable length post to be attached to the bottom of a portable barbecue grill.

Canadian Patent Number 911,835, issued to Orla D. Thompson on Oct. 10, 1972, shows a barbecue grill with a rotating cooking rack.

Canadian Patent Number 934,625, issued to Arthur L. Close, Jr. on Oct. 2, 1973, shows a barbecue grill with means to independently vary the heights of the cooking rack and the rack for holding the charcoal, relative to the bowl of the grill.

None of the above inventions and patents, taken either singly, or in combination, is seen to describe the instant invention as claimed.

SUMMARY OF THE INVENTION

The present invention is directed to a portable grill having telescoping legs that fold to allow the grill to be conveniently transported. The grill includes a substantially rectangular grate and two pairs of telescoping legs. Each pair of telescoping legs is pivotally attached to one end of the substantially rectangular grate. The grill can be used to cook food over an open fire, or the grill can be used to cook with charcoal with the aid of a charcoal tray that can be hung below the rectangular grate using S-hooks. The invention also includes a carrying case for allowing, the grill to be carried in a backpack without the grill soiling; other items in the backpack.

Accordingly, it is a principal object of the invention to provide a portable grill that can be carried in a backpack.

It is another object of the invention to provide a portable grill that has telescopic legs whose length can be varied by a user.

It is a further object of the invention to provide a portable grill that has legs that fold to make the grill more compact.

Still another object of the invention is to provide carrying case for a portable grill that allows the grill to be carried in a backpack without the grill soiling other items in the backpack.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
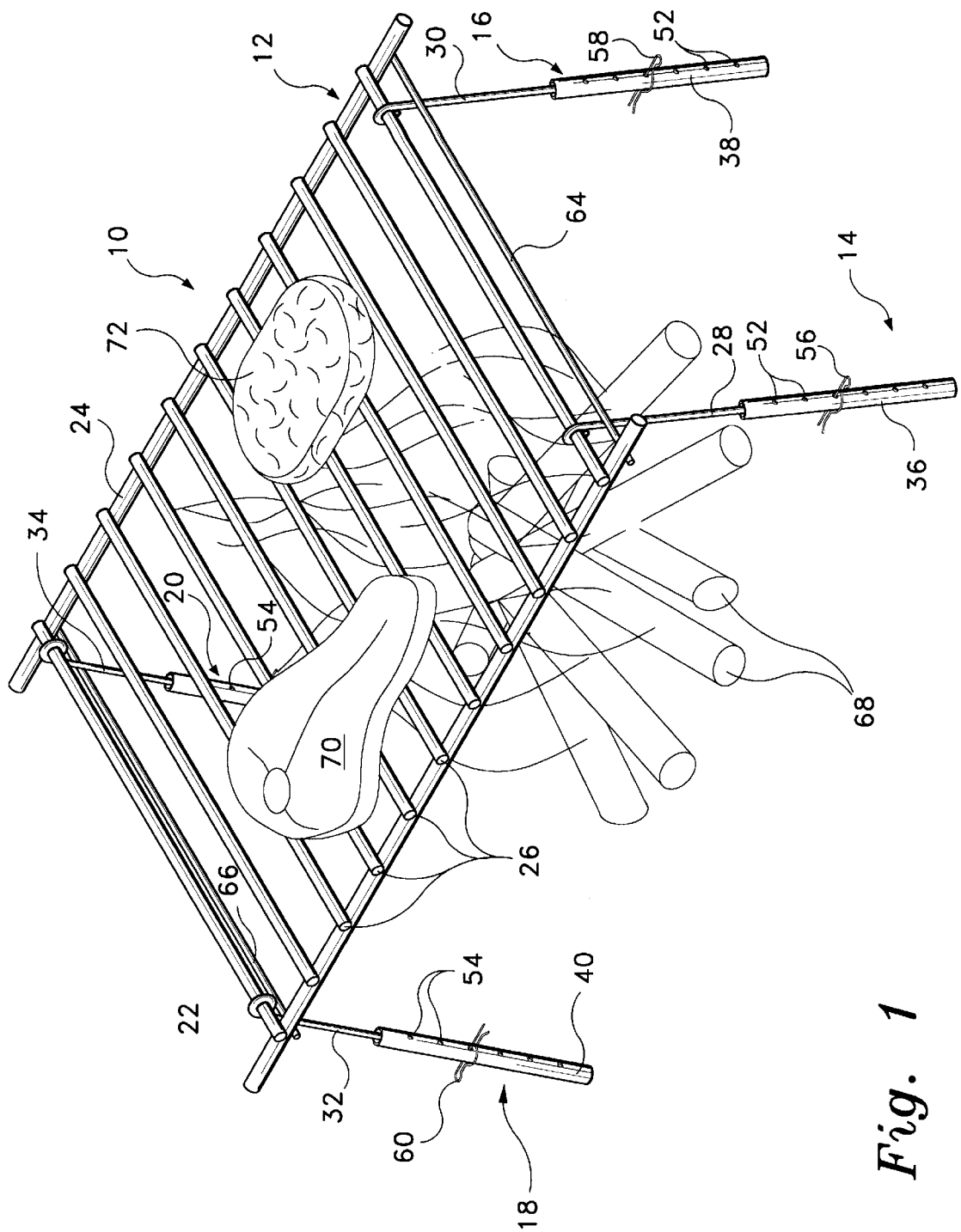
FIG. 1 is an environmental, perspective view of a portable grill with telescopic legs according to the present invention being used to cook food over an open fire.
Figure 2:
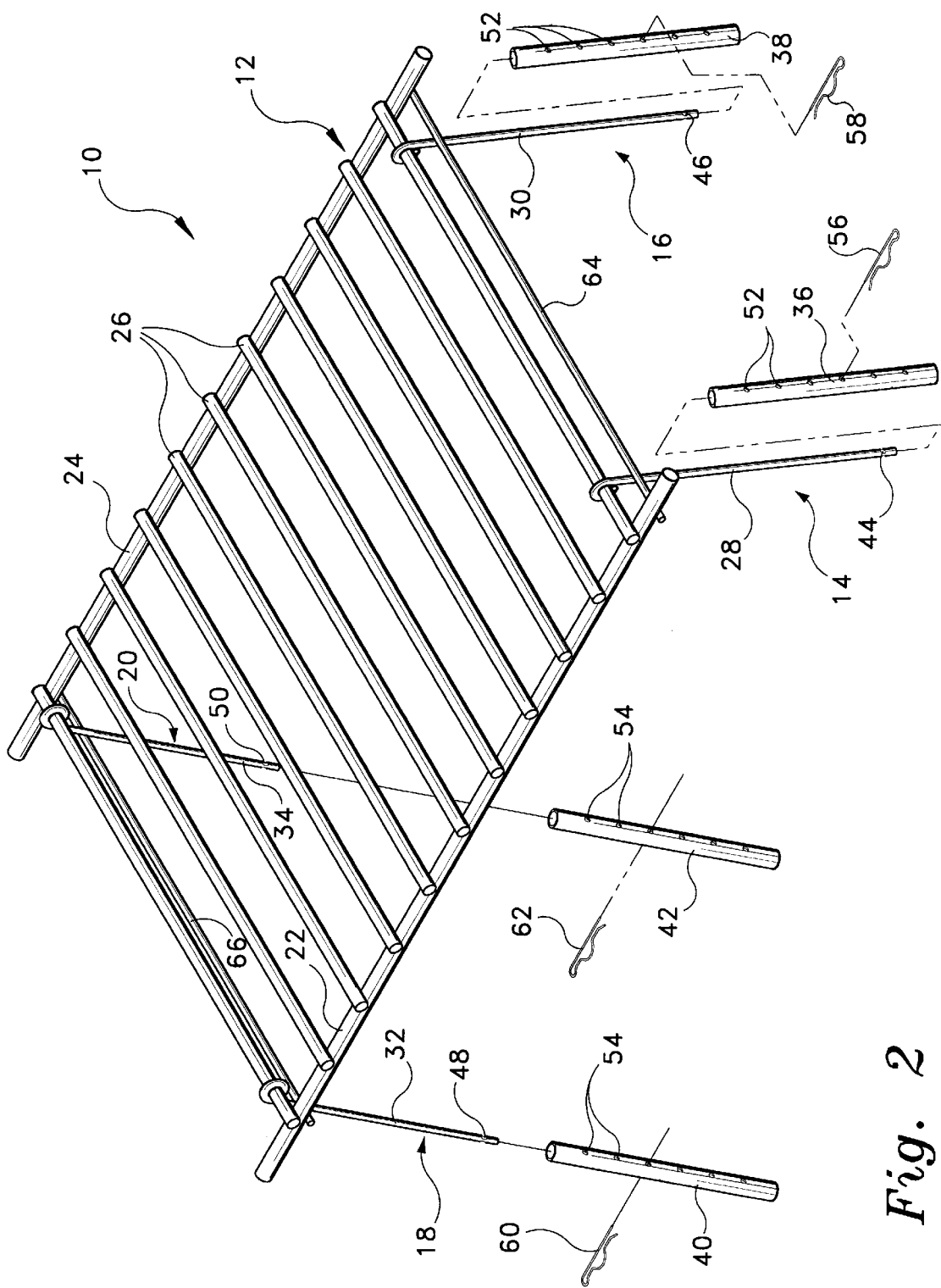
FIG. 2 is an exploded view of a portable grill with telescopic legs according to the present invention.
Figure 3:
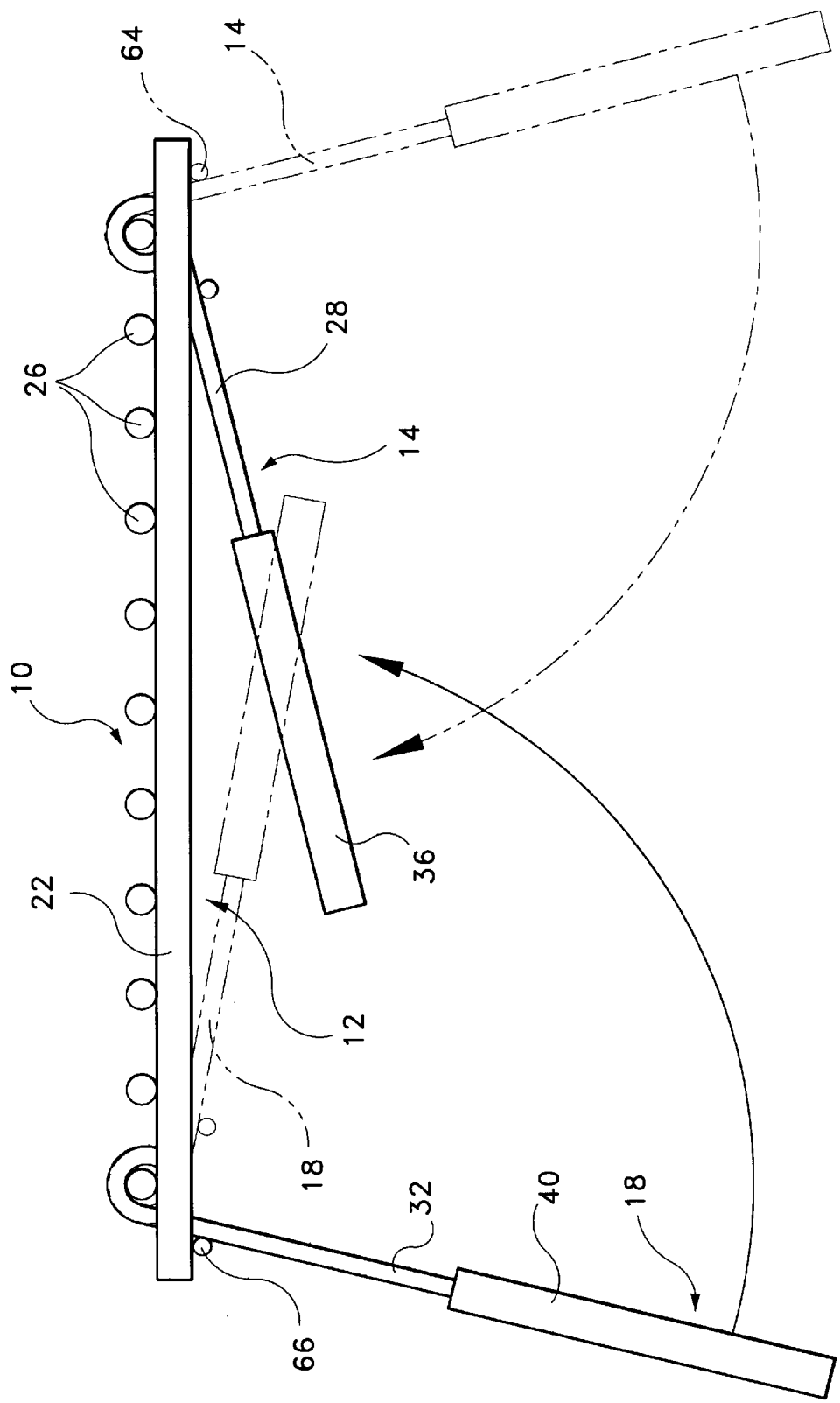
FIG. 3 is a side view of a portable grill with telescopic legs according to the present invention showing the legs in unfolded and partially folded positions.

Referring to FIGS. 1–3, a first embodiment of the present invention can be seen. The first embodiment of the present invention is a portable grill 10 which includes a grate 12 and four folding legs 14, 16, 18, and 20 that are adjustable in length or telescopic. The grate 12 is formed by a pair of parallel longitudinal bars 22 and 24 and a plurality of transverse bars 26. Each of the plurality of transverse bars 26 extends perpendicularly from a first one of the pair of longitudinal bars 22 to the second one of the pair of longitudinal bars 24. The plurality of transverse bars 26 are parallel to one another and are evenly spaced along the length of the pair of longitudinal bars 22 and 24. The plurality of transverse bars 26 are welded, brazed, or silver soldered to the pair of longitudinal bars 22 and 24. Each of the plurality of transverse bars 26 has a substantially circular cross section.

The legs 14, 16, 18, and 20 have pivoting members 28, 30, 32, and 34, respectively. Further, the legs 14, 16, 18, and 20 have sliding members 36, 38, 40, and 42, respectively. Each of the pivoting members 28, 30, 32, and 34 has a curled end which curls back to form a loop. This loop encircles a selected one of the plurality of transverse bars 26 so as to pivotally attach the I particular pivoting member 28, 30, 32, or 34 to the grate 12. Each of the pivoting members 28, 30, 32, and 34 has a through hole, 44, 46, 48, and 50 respectively, located near the second end of each pivoting member which is distal from the looped or curled end.

Each sliding member 36, 38, 40, or 42 is in the form of a tubular sleeve having a bore. Each sliding member 36, 38, 40, or 42 has a plurality of pairs of holes 52 and 54. Each hole 52 is in registry with a respective one of the holes 54 such that a cotter pin can pass completely through a sliding member 36, 38, 40, or 42 by being placed through a selected pair of holes 52 and 54. The diameter of the bore of each sliding member 36, 38, 40, and 42 is selected such that the substantially straight portion of the respective pivoting member 28, 30, 32, or 34, i.e. the portion excluding the looped end but including the second end, can fit into, the bore of each sliding member. The length of each leg can be varied by slidably moving the each of the sliding members 36, 38, 40, and 42 relative to its respective pivoting member 28, 30, 32, or 34 such that the respective pivoting member extends into the bore of the particular sliding member to varying amounts.

Each of the legs 14, 16, 18, and 20 is provided with a cotter pin 56, 58, 60, and 62, respectively. To fix the length of a particular one of the legs 14, 16, 18, and 20 at a desired value, a selected pair of holes 52 and 54 in the particular sliding member is aligned with the through hole 44, 46, 48, or 50 of the pivoting member of the particular leg, and a respective one of the cotter pins 56, 58, 60, and 62 is then placed through the selected hole 52, the through hole of the particular pivoting member, and the selected hole 54.

In the example illustrated in FIGS. 1–3, the legs 14 and 16 are pivotally attached to the first of the transverse bars 26 and the legs 18 and 20 are pivotally attached to the last one in the row of transverse bars 26. It is possible for the legs to be attached to other selected transverse bars 26, the only requirement being that the transverse bar to which the legs 14 and 16 are attached be spaced apart from the transverse bar to which the legs 18 and 20 are attached so that the grate 12 will be stably supported when the legs are unfolded.

A first bracing bar 64 is fixed, for example by welding, to the pivoting member 28 and to the pivoting member 30 such that the pivoting members 28 and 30 move pivotally as a unit. The pivoting members 28 and 30, and thus the legs 14 and 16, are pivotally movable between a folded position and an unfolded position. With, the pivoting members 28 and 30 in the folded position, the legs 14 and 16 lie substantially flat against the bottom of the grate 12. In the fully unfolded position, the legs 14 and 16 form an obtuse angle with the grate 12 such that the weight of the grate or the I weight of objects placed on the grate tend to maintain the legs 164 and 16 in the unfolded position. The bracing bar 64 extends between the legs 14 and 16 and has portions which extend laterally beyond each of the legs 14 and 16 such that portions of the bar 64 are positioned below the longitudinal bars 22 and 24. With the legs 14 and 16 in the unfolded position, the bracing bar 64 abuttingly contacts at least one of the pair of parallel longitudinal bars 22 and 24 in order to limit the maximum obtuse angle that the legs 14 and 16 can assume relative to the grate 12 when the legs 14 and 16 are in the unfolded position.

A second bracing bar 66 is fixed, for example by welding, to the pivoting member 32 and to the pivoting member 34 such that the pivoting members 32 and 34 move pivotally as a unit. The pivoting members 32 and 34, and thus the legs 18 and 20, are pivotally movable between a folded position and an unfolded position. With the pivoting members 32 and 34 in the folded position, the legs 18 and 20 lie substantially flat against the bottom of the grate 12. In the fully unfolded position, the legs 18 and 20 form an obtuse angle with the grate 12 such that the weight of the grate or the weight of objects placed on the grate tend to maintain the legs 18 and 20 in the unfolded position. The bracing bar 66 extends between the legs 18 and 20 and has portions which extend laterally beyond each of the legs 18 and 20 such that portions of the bar 66 are positioned below the longitudinal bars 22 and 24. With the legs 18 and 20 in the unfolded position, the bracing bar 66 abuttingly contacts at least one of the pair of parallel longitudinal bars 22 and 24 in order to limit the maximum obtuse, angle that the legs 18 and 20 can assume relative to the grate 12 when the legs 18 and 20 are in the unfolded position.

In order to prevent the legs 14 and 16 from interfering with legs 18 and 20 as all the legs are being folded, the legs 14 and 161 are spaced a little closer together as compared to the legs 18 and 20 such that the legs 14 and 16 fit between the legs 18 and 20 when both pairs of legs are in the folded position. Alternatively, the! legs 14 and 16 could be the same distance apart as compared to the legs 18 and 20, however, each pair of legs must be spaced apart such that the pair can move along the common transverse bar 26 so as to leave enough room, between one of the longitudinal bars 221 and 24 and one of the first pair of legs, for one of the other pair of legs to fit in when both pairs of legs are in the folded position. Thus, for example, if the legs 14 and 16 are folded such that the leg 14 is immediately adjacent the longitudinal bar 22 and the legs 18 and 20 are folded such that the leg 20 is immediately adjacent the longitudinal bar 24, then the leg 16 will be spaced from the longitudinal bar 24, the leg 20 will be positioned, between the leg 16 and the longitudinal bar 24, and the leg 18 will lie immediately adjacent the leg 14 and intermediate the legs 14 and 16. The axis defined by the centers of the holes 52 and 54 in each of the sliding members 36, 38, 40, and 42 and the longitudinal axis of the respective one of the through holes 44, 46, 48, and 50 lie in a plane which also contains the longitudinal axis of the respective one of the legs 14, 16, 18, and 20 in both the folded and unfolded positions. This arrangement ensures that the cotter pins 56, 58, 60, and 62 will not catch on the longitudinal bars 22 and 24 as the legs 14, 16, 18, and 20 are being folded.

In use, the legs 14, 16, 18, and 20 are first unfolded. Then the length of each of the legs 14, 16, 18, and 20 is individually adjusted so as to support the grate 12 in a horizontally level orientation above the ground. One advantage of the legs 14, 16, 18, and 20 being individually adjustable in length is that the length of the legs can be varied so as to keep the grate 12 horizontally level even on sloping ground. To adjust the length of each of the legs 14, 16, 18, and 20, the respective cotter pin 56, 58, 60, or 62 is first removed. Then the respective sliding member 36, 38, 40, or 42 is slidably moved relative to a respective one of the pivoting members 36, 38, 40, and 42 until a selected pair of holes 52 and 54 of the respective sliding member are aligned with the respective through hole 44, 46, 48, or 50. The selected pair of holes 52 and 54 of the respective sliding member are selected such that the overall length of the leg in question will be as close as possible to the desired length when the selected pair of holes 52 and 54 are in alignment with the respective through hole 44, 45, 48, or 50. Then the respective cotter pin 56, 58, 60, or 62 is placed through the selected pair of holes 52 and 54 and the respective through hole 44, 46, 48, or 50 to fix the length of the particular leg 14, 16, 18, or 20. This procedure is carried out for all four legs. Once all four legs are at the desired length, the grill 10 is placed on the ground. Logs 68 are placed below the grate 12 and then the logs are set on fire. Then food items such as meat, for example the steak 70 and the hamburger patty 72, are placed on the grate 12 and allowed to cook.

Figure 5:
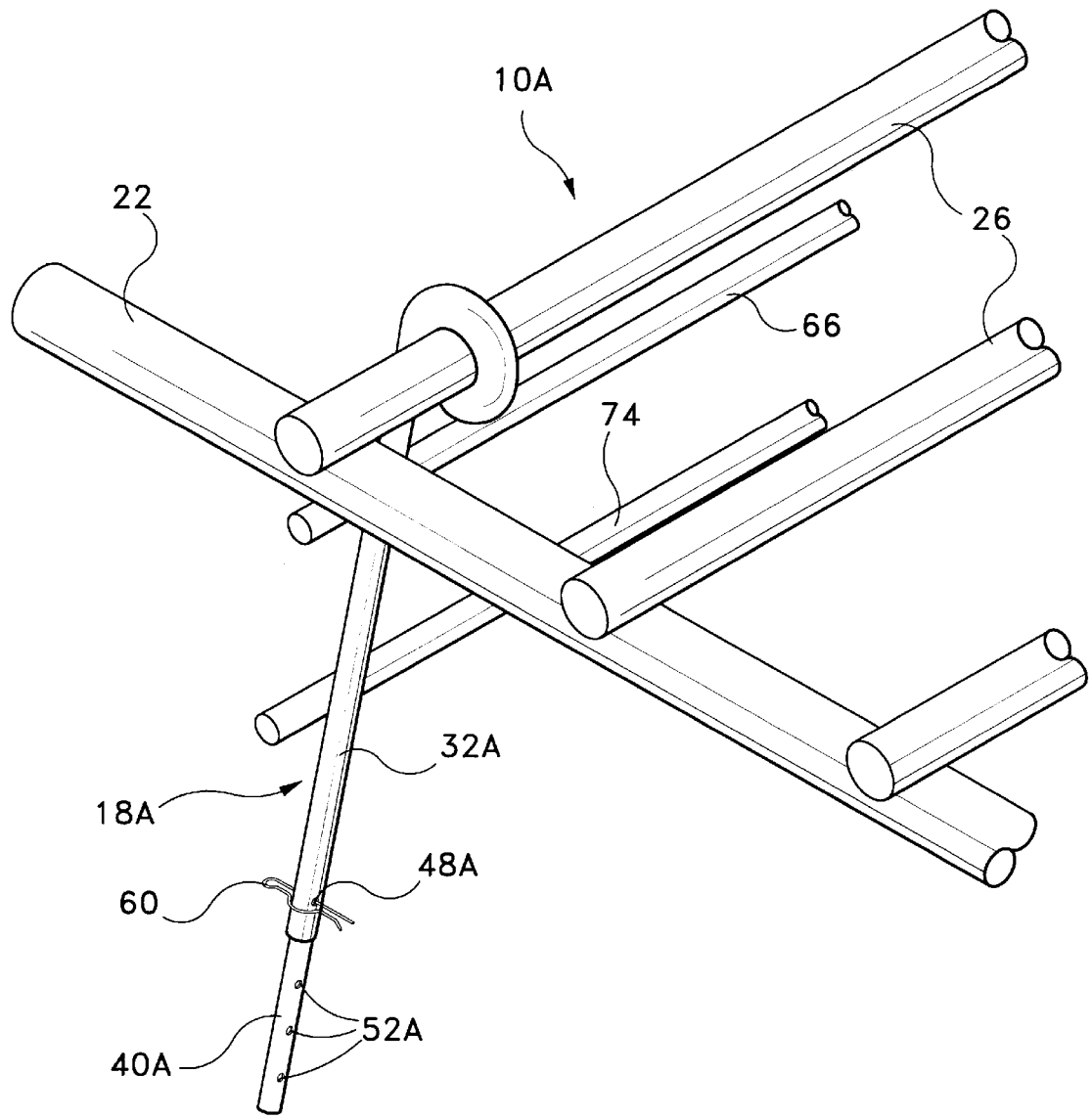
FIG. 5 is a fragmentary view of an alternative embodiment of the portable grill with telescopic legs according to the present invention.

Referring to FIG. 5, an alternative embodiment 10a of the portable grill of the present invention can be seen. The grill 10a is identical to the grill 10 in every respect except for the structure of the legs. In FIG. 5 a single leg 18a is used to illustrate the difference between the legs in the embodiments 10 and 10a. The other three legs in the grill 10a are identical to the leg 18a and therefore are not shown. In the grill 10a at least the straight portion of the pivoting member 32a, as distinguished from the looped portion of the pivoting member which surrounds the transverse bar 26, has a hollow bore which extends along the length of the straight portion of the pivoting member. The sliding member 40a then fits at least in part into the hollow bore of the pivoting member 32a. The length of the leg 18a can be varied by slidably moving the sliding member 40a relative to the pivoting member 32a, such that the length of the portion of the sliding member 40a which projects from the pivoting member 32a is varied. The sliding member 40a is bored completely through at a plurality of locations: along its length such that the sliding member 40a has a plurality of through bores 52a distributed along its length. The pivoting member 32a has a pair of concentric holes 48a (only one shown) on either side of its hollow bore near the end of the pivoting member which is distal from the looped portion of the pivoting member. The length of the leg 18a can be fixed at a desired value by slidably moving the sliding member 40a relative to the pivoting member 32a until a selected through bore 52a, corresponding to the desired length, is in alignment with the pair of holes 48a. The cotter pin 60 is then placed through the holes 48a and the through bore 52a in order to secure the sliding member 40a in place relative to the pivoting member 32a. A second bracing bar 74, identical to the bracing bar 66, can be fixed to each pair of pivoting members which are pivotally attached to the same transverse bar 26 to give the legs added rigidity.

Figure 4:
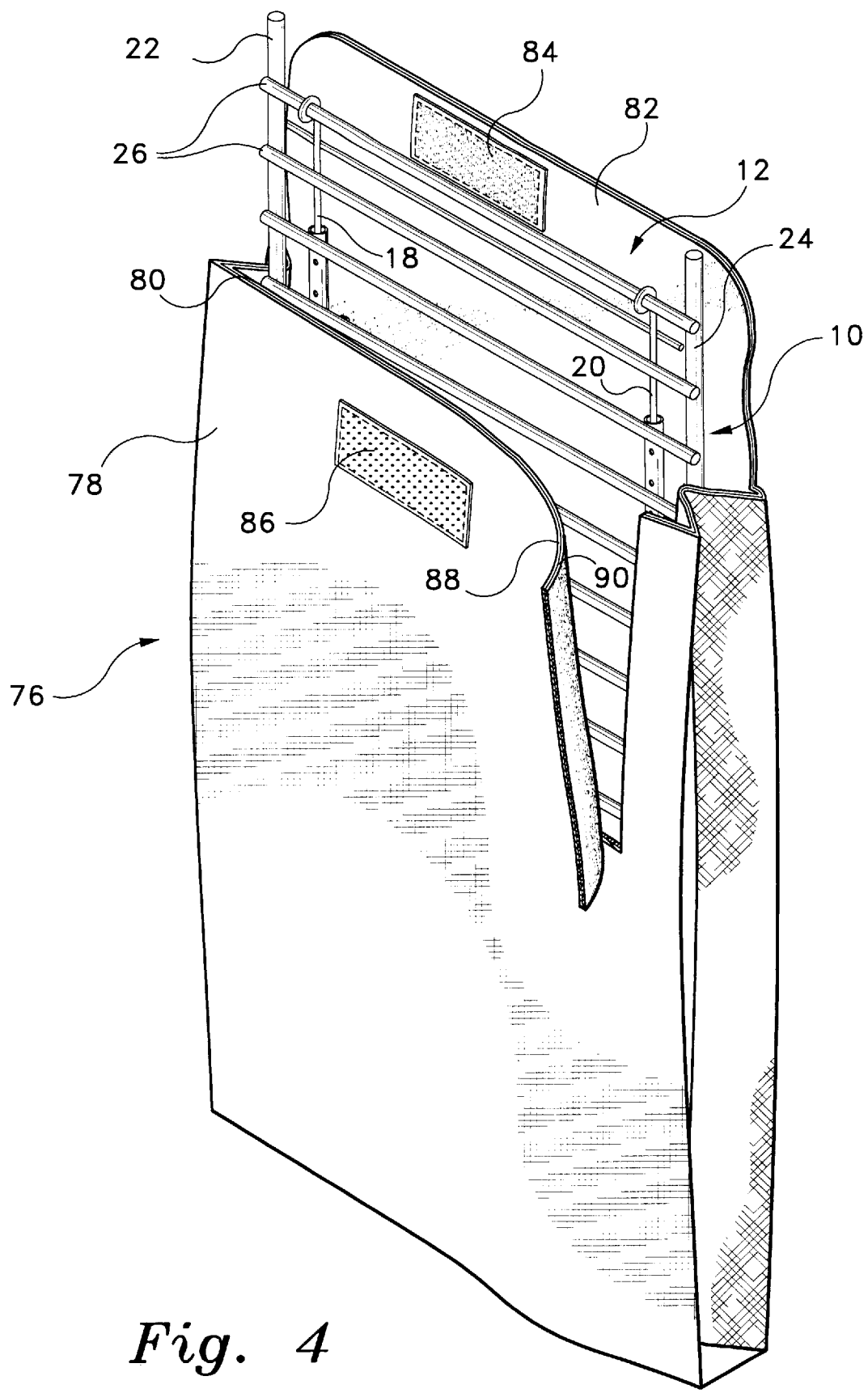
FIG. 4 is an environmental, perspective view of a portable grill with telescopic legs according to the present invention being inserted into its carrying case.

Referring to FIG. 4, a carrying case 76 for the grills 10 and 10a can be seen. The carrying case 76 includes a bag 78 having a top opening 80. The bag 78 and its top opening 80 are shaped and dimensioned to receive at least the grill 10 or 10a with the grill's legs in the folded position. The carrying case 76 also includes a flap 82 which acts as a closure for the bag 78. A hook and loop fastener system having complementary portions 84 and 86 is used to secure the flap 82 in the closed position. The fastener portion 84 is fixed to the inner surface of the flap 82, while the fastener portion 86 is fixed to the outer surface of the bag 78 near the top opening 80. The carrying case 76 is at least of two ply construction having an outer layer 88 made of a polymer sheet, material that is impervious to grease and moisture and a woven fabric inner layer 90. The carrying case 76 allows the grill 10 or 10a to be carried in a backpack, after the grill has been used for cooking, without the grill soiling the other contents of the backpack.

Figure 6:
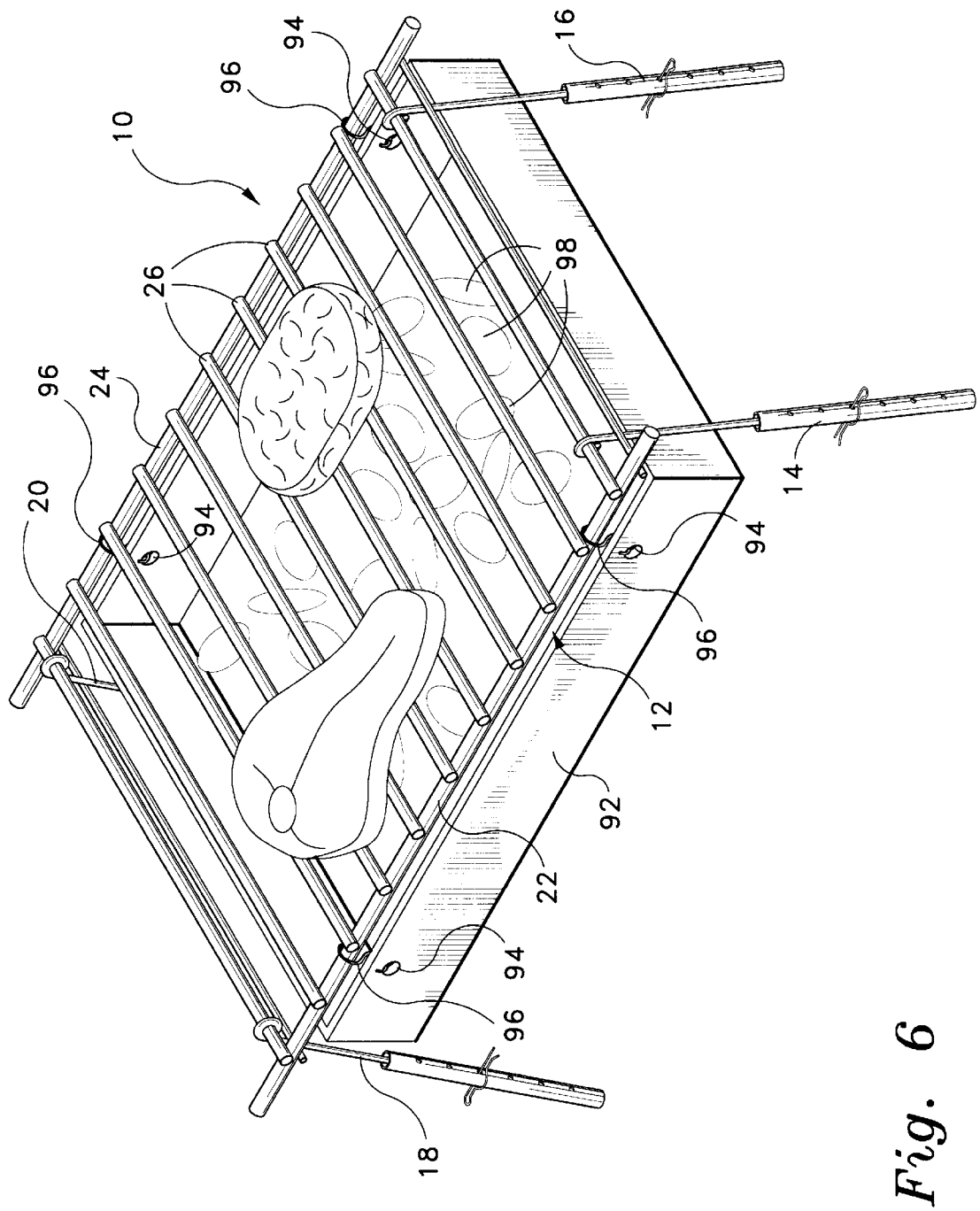
FIG. 6 is an environmental, perspective view of a portable grill with telescopic legs according to the present invention being used to cook food over a charcoal fire.

Referring to FIG. 6, the grill 10 or 10a can be provided with a charcoal pan 92 which is substantially rectangular in plan view. The charcoal pan 92 has four sidewalls and at least four holes 94.

The holes 94 are formed in an opposing pair of the four sidewalls with two holes 94 being formed in each of the opposing sidewalls. Each of the four holes 94 has an S-hook 96 engaged thereto. The four S-hooks 96 are used to suspend the charcoal pan 92 from the grate 12. The S-hooks 96 can be hooked to either the parallel longitudinal bars 22 and 24 or to the transverse bars 26 in order to hold the charcoal pan 92 suspended under the grate 12. Charcoal briquettes 98 are placed in the pan 92 and lighted to cook the food on the grate 12. The pan 92 allows charcoal to be used as a substitute for the logs 68 when charcoal is available. Preferably, the carrying case 76 is made large enough to hold the pan 92 in addition to the grill 10 or 10a.

It is to be understood that the present invention is not limited to the sole embodiments described above, but encompasses any and all embodiments within the scope of the following claims.

I claim:

1. A portable grill comprising:

a grate being formed by a pair of parallel longitudinal bars and a plurality of transverse bars each extending perpendicularly, from a first one of said pair of longitudinal bars to a second one of said pair of longitudinal bars, said plurality of transverse bars being parallel to one another and being evenly spaced along said pair of longitudinal bars;

a first pair of telescoping legs including a first telescoping leg, a second telescoping leg, and a first bracing bar, said first telescoping leg having a first pivoting member, a first sliding member, and a first cotter pin, said first pivoting member having a first end portion which is curled around a first selected one of said plurality of transverse members so as to provide for pivotal attachment of said first pivoting member to said first selected one of said plurality of transverse members, said first pivoting member having a second end portion and a first pivoting member hole provided along said second end portion of said first pivoting member, said first sliding member being tubular and receiving at least said second end portion of said first pivoting member therein, said first sliding member having a plurality of pairs of first sliding member holes distributed along its length, said first sliding member being movable relative to said first pivoting member such that said first pivoting member extends into said first sliding member to varying amounts as selected by a user, said first telescoping leg having a first length, said first length being fixed at a user selected value by placing a selected pair of said plurality of pairs of first sliding member holes in registry with said first pivoting member hole and placing said first cotter pin through said selected pair of said plurality of pairs of first sliding member holes and said first pivoting member hole, said second telescoping leg having a second pivoting member, a second sliding member, and a second cotter pin, said second pivoting member having a first end portion which is curled around; said first selected one of said plurality of transverse members so as to provide for pivotal attachment of said second pivoting member to said first selected one of said plurality of transverse members, said second pivoting member having a second end portion and a second pivoting member hole provided along said second end portion of said second pivoting member, said second sliding member being tubular and receiving at least said second end portion of said second pivoting member therein, said second sliding member having a plurality of pairs of second sliding member holes distributed along its length, said second sliding member being movable relative to said second pivoting member such that said second pivoting member extends into said second sliding member to varying amounts as selected by a user, said second telescoping leg having a second length, said second length being fixed at a user selected value by placing a selected pair of said plurality of pairs of second: sliding member holes in registry with said second pivoting member hole and placing said second cotter pin through said selected pair of said plurality of pairs of second sliding member holes and said second pivoting member hole, said first bracing bar being fixed to said first pivoting member and to said second pivoting member such that said first pivoting member and said second pivoting member move pivotally as a unit, said first pivoting member and said second pivoting member pivoting between a first folded position and a first unfolded position at a first maximum unfolded angle relative to said grate, said first bracing bar being sufficiently long so as to abuttingly contact at least one of said pair of parallel longitudinal bars in order to limit said first maximum unfolded angle; and a second pair of telescoping legs including a third telescoping leg, a fourth telescoping leg, and a second bracing bar, said third telescoping leg having a third pivoting member, a third sliding member, and a third cotter pin, said third pivoting member having a first end portion which is curled around a second, selected one of said plurality of transverse members so as to provide for pivotal attachment of said third pivoting member to said second selected one of said plurality of transverse members, said second selected one of said plurality of transverse members being spaced apart from said first selected one of said plurality of transverse members, said third pivoting member having a second end portion and a third pivoting member hole provided along said second end portion of said third pivoting member, said third sliding member being tubular and receiving at least said second end portion of said third pivoting member therein, said third sliding member having a plurality of pairs of third sliding member holes distributed along its length, said third sliding member being movable relative to said third pivoting member such that said third pivoting member extends into said third sliding member to varying amounts as selected by a user, said third telescoping leg having a third length, said third length being fixed at a user selected value by placing a selected pair of said plurality of pairs of third sliding member holes in registry with said third pivoting member hole and placing said third cotter pin through said selected pair of said plurality of pairs of third sliding member holes and said third pivoting member hole, said fourth telescoping leg having a fourth pivoting member, a fourth sliding member, and a fourth cotter pin, said fourth pivoting member having a first end portion which is curled around said second selected one of said plurality of transverse members so as to provide for pivotal attachment of said fourth pivoting member to said second selected one of said plurality of transverse members, said fourth pivoting member having a second end portion and a fourth pivoting member hole provided along said second end portion of said fourth pivoting member, said fourth sliding member being tubular and receiving at least said second end portion of said fourth pivoting member therein, said fourth sliding member having a plurality of pairs of fourth sliding member holes distributed along its length, said fourth sliding member being movable relative to said fourth pivoting member such that said fourth pivoting member extends into said fourth sliding member to varying amounts as selected by a user, said fourth telescoping leg having a fourth length, said fourth length being fixed at a user selected value by placing a selected pair of said plurality of pairs of fourth sliding member holes in registry with said fourth pivoting member hole and placing said fourth cotter pin through said selected pair of said plurality of pairs of fourth sliding member holes and said fourth pivoting member hole, said second bracing bar being fixed to said third pivoting member and to said fourth pivoting member such that said third pivoting member and said fourth pivoting member move pivotally as a unit, said third pivoting member and said fourth pivoting member, pivoting between a second folded position and a second unfolded, position at a second maximum unfolded angle relative to said grate, said second bracing bar being sufficiently long so as to abuttingly contact at least one of said pair of parallel longitudinal bars in order to limit said second maximum unfolded angle.

2. The portable grill according to claim 1, further including:

a charcoal pan being substantially rectangular in plan view, said charcoal pan having four sidewalls, said charcoal pan having at least four holes with each one of an opposing pair of said four sidewalls having two of said at least four holes formed therein; and four S-hooks each engageable to a respective one of said at least four holes and to one of said pair of parallel longitudinal bars and said plurality of transverse bars in order to hold said charcoal pan suspended under said grate.

3. The portable grill according to claim 2, further including a carrying case in the form of a flexible pouch having an opening, said pouch being sized to receive at least the portable grill with said first and second pairs of telescoping legs folded, said carrying case having a flap provided adjacent said opening of said pouch, said flap acting as a closure for said pouch, said carrying case being provided with hook-and-loop fastener means for securing said flap in place when said flap is acting to close said opening of said pouch.

\* \* \* \* \*